US009879489B2

(12) United States Patent
Shanks et al.

(10) Patent No.: US 9,879,489 B2
(45) Date of Patent: Jan. 30, 2018

(54) FLOATING GAS TRAP SYSTEM USING AGITATION

(71) Applicant: Floatair Agitator Limited Liability Company, Carlsbad, NM (US)

(72) Inventors: David L. Shanks, Carlsbad, NM (US); Joseph Michael Vlosich, III, Carlsbad, NM (US)

(73) Assignees: David L. Shanks, Carlsbad, NM (US); Joseph Michael Vlosich, III, Carlsbad, NM (US)

( * ) Notice: Subject to any disclaimer, the term of this patent is extended or adjusted under 35 U.S.C. 154(b) by 650 days.

(21) Appl. No.: 14/455,377

(22) Filed: Aug. 8, 2014

(65) Prior Publication Data

US 2015/0211311 A1    Jul. 30, 2015

Related U.S. Application Data

(60) Provisional application No. 61/866,004, filed on Aug. 14, 2013.

(51) Int. Cl.
*B01D 19/00* (2006.01)
*E21B 21/06* (2006.01)
*E21B 49/00* (2006.01)

(52) U.S. Cl.
CPC ........ *E21B 21/067* (2013.01); *B01D 19/0052* (2013.01); *E21B 49/005* (2013.01)

(58) Field of Classification Search
CPC ...... E21B 21/00; E21B 21/067; E21B 49/005; B01D 19/00; B01D 19/0052
USPC ....................... 95/8, 24, 260, 261
See application file for complete search history.

(56) References Cited

U.S. PATENT DOCUMENTS

| 2,447,595 A | 8/1948 | Pigott et al. |
| 3,635,092 A | 1/1972 | Maughan et al. |
| 3,699,814 A | 10/1972 | Kaufman |
| 3,817,100 A | 6/1974 | Anderson et al. |
| 3,884,081 A | 5/1975 | Griffith |
| 4,040,299 A | 8/1977 | Snyder |
| 4,272,258 A | 6/1981 | Shifflett |
| 4,358,298 A | 11/1982 | Ratcliff |
| 4,367,078 A | 1/1983 | Hendrix |

(Continued)

OTHER PUBLICATIONS

Written Opinion of International Searching Authority dated May 7, 2015.
International Preliminary Report on Patentability, dated Feb. 14, 2017, from PCT/US2015/012545.
Notification Concerning Transmittal of IPRP, dated Feb. 23, 2017, from PCT/US2015/012545.

(Continued)

*Primary Examiner* — T. Bennett McKenzie
(74) *Attorney, Agent, or Firm* — Thrive IP; Peter L. Brewer

(57) ABSTRACT

A gas trap system for releasing gas-phase fluids is provided herein. The gas trap system is designed to reside within a return fluids tank, such as at a drill site. The gas trap system first includes a gas trap. The gas trap is configured to agitate drilling fluids in the return tank, and then to release gases during agitation. Liquids are circulated and released through a liquids exhaust port while gases are released through a gas exhaust port near the top of the gas trap. The gas trap system is configured to float along vertical guide rods in response to changes in height, weight and viscosity of the drilling fluids in the return tank. A method of capturing gaseous phase fluids from a fluid return is also provided herein. The fluid return is preferably drilling fluids at a drill site.

22 Claims, 13 Drawing Sheets

(56) References Cited

U.S. PATENT DOCUMENTS

| | | | |
|---|---|---|---|
| 4,482,133 A * | 11/1984 | Bishop | B65H 59/381 254/291 |
| 5,161,417 A | 11/1992 | Strong et al. | |
| 5,199,509 A | 4/1993 | Wright et al. | |
| 5,621,180 A | 4/1997 | Simon et al. | |
| 5,648,603 A | 7/1997 | Hanson | |
| 5,902,378 A | 5/1999 | Obrejanu | |
| 6,389,878 B1 | 5/2002 | Zamfes | |
| 6,666,099 B2 * | 12/2003 | Taylor | E21B 21/067 73/863.12 |
| 7,350,536 B2 | 4/2008 | Evans | |
| 7,655,079 B2 | 2/2010 | Lai et al. | |
| 7,741,605 B2 | 6/2010 | Gunn et al. | |
| 7,794,527 B2 | 9/2010 | Sterner | |
| 7,814,782 B2 | 10/2010 | DiFoggio | |
| 7,844,400 B1 | 11/2010 | Selman et al. | |
| 7,957,903 B1 | 7/2011 | Selman et al. | |
| 8,632,625 B2 | 1/2014 | DeGreeve et al. | |
| 8,720,287 B2 | 5/2014 | Haney | |
| 2002/0043620 A1 | 4/2002 | Tchakarov et al. | |
| 2004/0010587 A1 | 1/2004 | Altamirano et al. | |
| 2005/0132889 A1 | 6/2005 | MacDuff | |
| 2006/0254421 A1 | 11/2006 | Boone | |
| 2008/0047370 A1 | 2/2008 | Vickery, Jr. | |
| 2009/0077936 A1 * | 3/2009 | Sterner | E21B 49/005 55/422 |
| 2009/0136298 A1 | 5/2009 | Augenstein et al. | |
| 2010/0051065 A1 * | 3/2010 | Tallman | G03G 5/00 134/36 |
| 2010/0101197 A1 * | 4/2010 | Livingstone | B01D 46/0006 55/356 |
| 2012/0000278 A1 | 1/2012 | Phillips | |
| 2013/0042666 A1 | 2/2013 | Santucci et al. | |
| 2013/0275047 A1 | 10/2013 | Selman et al. | |

OTHER PUBLICATIONS www.usgeosupply.com website showing USGI gas trap agitators and stands accessed Sep. 5, 2014.

www.usgeosupply.com website showing Ratcliff gas trap agitators and stands accessed Sep. 5, 2014.

www.usgeosupply.com web page showing Mudlogger's gas trap accessed Sep. 5, 2014.

www.usgeosupply.com web page showing USGI and Ratcliff gas trap jack accessed Sep. 5, 2014.

www.usgeosupply.com web page showing USGI and Ratcliff gas trap jack with frame accessed Sep. 5, 2014.

www.usgeosupply.com web page showing 6" gas trap accessed Sep. 5, 2014.

www.usgeosupply.com web page showing 5" gas trap accessed Sep. 5, 2014.

www.usgeosupply.com web page showing 5" AM gas trap no post or jack accessed Sep. 5, 2014.

www.usgeosupply.com web page showing USGI gas trap only, no motor accessed Sep. 5, 2014.

www.usgeosupply.com web page showing universal mount for gas trap accessed Sep. 5, 2014.

www.iballinstuments.com website showing the Cavitator brand Mud Gas Extractor accessed Sep. 5, 2014.

www.iballinstuments.com pdf link showing the Cavitator Gas Extractor Data Sheet accessed Sep. 5, 2014.

www.iballinstuments.com pdf link showing the Cavitator Gas Extractor Manualaccessed Sep. 5, 2014.

www.petrowiki.org web page discussing surface data sensors during drilling accessed Sep. 5, 2014.

www.rigsat.com website showing the Portable Gas Detector and Agitator accessed Sep. 5, 2014.

* cited by examiner

FLOATING GAS TRAP SYSTEM USING AGITATION

CROSS REFERENCE TO RELATED APPLICATIONS

This application claims the benefit of U.S. Ser. No. 61/866,004 filed Aug. 14, 2013. That application is entitled "Improved Gas Trap System Using Agitation," and is incorporated herein by reference in its entirety.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

BACKGROUND OF THE INVENTION

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

Field Of The Invention

The present disclosure relates to the field of subsurface drilling. More specifically, the present invention relates to an agitator used to release gases entrained in drilling mud returns during a well drilling operation.

Technology In The Field Of The Invention

In the drilling of oil and gas wells, a wellbore is formed using a drill bit that is urged downwardly at a lower end of a drill string. After drilling to a predetermined depth, the drill string and bit are removed and the wellbore is lined with a string of casing. Once the wellbore has reached total depth and all casing strings are in place, a string of tubing is typically installed along the casing down to a depth of a designated subsurface formation. The tubing string may either be production tubing or injection tubing. A well head is fixed at the surface above the wellbore for suspending the tubing, controlling wellbore pressures, and directing the flow of fluids into or out of the wellbore, all as part of hydrocarbon recovery operations.

During the drilling process, a drilling fluid is continuously pumped into the wellbore. Drilling fluids are typically made up of clays and chemical additives which are carried in an oil or water base. The drilling fluid, sometimes referred to as "mud," is pumped down the drill string and to the drill bit at the lower end of the wellbore. The fluid is further pumped through openings or nozzles in the drill bit where the fluid picks up rock chips. The fluid and carried chips are then pumped back to the surface via an annulus residing between the drill pipe and the surrounding subsurface rock matrices.

The primary function of the mud is to cool and lubricate the drill bit as rock is being cut. However, the mud also carries drill cuttings up and out of the well and to the surface. Samples of the drill cuttings may be collected at shale shakers and analyzed during a drilling process. Also, the mud maintains a hydrostatic pressure within the wellbore which prevents pressurized fluids in subsurface formations from blowing out through the borehole. This situation is known as a "kick."

During the drilling operation, the drill bit will penetrate one or more zones of comparatively high pressure adjacent the formations being drilled. In some subsurface formations, hydrocarbon gases under pressure will invade the wellbore. Those gases will typically include at least methane and ethane, and will frequently also contain carbon dioxide and/or hydrogen sulfide and/or nitrogen. The gas constituents become entrained in the drilling fluid as the drill bit penetrates the formation.

As the drilling fluid returns to the surface, it carries information about the nature of the formations being drilled. This information resides in the gases and rock chips held in the mud. Service companies are frequently retained to analyze drill cuttings and capture gases that break out of the drilling mud solution once the mud has returned to the surface. By examining the cuttings for traces of hydrocarbons, and by examining the quantity and type of gases released, a petroleum geologist or lab chemist may determine the likelihood of producing oil and/or gas from the well, and at what depths.

In the case of gas, gas is typically extracted from the mud by mechanical agitation using a so-called gas trap. The gas trap may be located in a possum belly, or "header tank," at the rig. A possum belly is a metal container at the head of the shale shaker. The possum belly is connected to the return flow line at the surface and slows the flow of fluids after they have gained momentum from coming down the flow line. This, in turn, prevents the drilling fluids from shooting off of the shale shakers.

In some instances, the gas trap is in a box adjacent the shale shakers. More frequently, the gas trap is in the return mud tank or pit beyond the shale shakers. Some of these gas traps include beaters or agitators that cause gas to break out of solution.

In any arrangement, the captured gas is analyzed for hydrocarbons and/or total gas content using one or more detectors. Known detectors include catalytic combustion detectors (CCD), thermal conductivity detectors (TCD) and flame ionization detectors (FID). Separation and quantification of the different hydrocarbon gases (e.g. methane through pentanes) are then typically carried out via gas chromatography techniques with similar or different detectors.

U.S. Pat. No. 7,741,605 issued in 2010 discusses techniques for analyzing gases that are released from a gas trap. This patent, entitled "Method and Apparatus for Detecting Gas Conveyed by Drilling Fluids," was assigned to Varco I/P, Inc. The '605 patent is incorporated by reference herein in its entirety.

For so-called gas trap agitators, a challenge exists with respect to the placement of the gas trap. In this respect, the gas trap needs to be substantially submerged in the fluid return tank (such as a mud tank) so that the agitator is able to stir the return fluids, thereby encouraging gas breakout. At the same time, if the return fluids get too high in the tank, the fluids can interfere with the release of gases into the riser above the agitator. Positioning the gas trap becomes more difficult due to constant changes in fluid viscosity and density in the returns.

Therefore, a need exists for an improved gas trap that is able to accommodate changes in fluid levels in a mud tank. Further, a need exists for a method of capturing gas returns using a gas trap that is able to float in the tank, thereby adjusting for variations in depth, weight and viscosity of the drilling mud during the drilling process.

BRIEF SUMMARY OF THE INVENTION

A gas trap system for releasing gas-phase fluids is provided herein. The gas trap system is designed to reside within a return mud tank at a drill site.

The gas trap system first includes a gas trap. The gas trap is configured to agitate drilling fluids in a return tank, and then to release gases during agitation. Preferably, the gas trap includes a rotary motor for creating the agitation. Gases are released through a gas exhaust port, and then to a line which carries the released gases to a gas riser assembly.

The gas trap comprises a canister. The canister has an upper end and a lower end. Preferably, the canister defines a tubular body forming a chamber between the upper and lower ends. In one aspect, the canister defines a pair of tubular bodies forming an upper chamber, and a lower chamber positioned below the upper chamber.

The gas trap also includes an impeller. The impeller is positioned proximate the lower end of the canister. The impeller is rotated by a rotary motor, such as an air motor. When rotated, the impeller draws drilling fluids up into the chamber of the canister.

The gas trap further includes a shaft. The shaft resides axially along the canister, with the shaft operatively connecting the motor to the impeller to impart rotational movement to the impeller. The impeller agitates the drilling fluids while pulling the drilling fluids up into the canister.

The gas trap also has a baffle. The baffle resides within the canister above the impeller. The baffle includes at least one through-passage for permitting gases to escape upward, but substantially preventing upward movement of liquids during fluid agitation. In one aspect, the canister defines an upper chamber above the baffle, and a lower chamber below the baffle.

The gas trap further includes a liquids exhaust port. The liquids exhaust port resides below the baffle. The liquids exhaust port circulates fluids out of the canister. Stated another way, the liquids exhaust port provides an outlet for liquids that are drawn into the canister by the impeller.

As noted, the gas trap also includes a gas exhaust port. The gas exhaust port is configured to release gases from the canister during agitation. The gas exhaust port is preferably disposed above the baffle. Gases are exhausted through a fluid line to a gas riser assembly, and ultimately to a lab for analysis.

The gas trap system additionally includes at least one guide rod. Preferably, the at least one guide rod comprises at least two guide rods. In one aspect, a pair of vertically-oriented stainless steel tubes is used as guide rods.

Further, the gas trap system optionally comprises a ballast. The ballast defines a sealed housing that holds a volume of fluid. In this way, the ballast moves the gas trap up and down along the at least one vertical guide rod in response to changes in height, weight and/or viscosity of the drilling fluids in the return tank. To accommodate this movement, the ballast contains through-openings for slidably receiving the respective guide rods.

The guide rods may be mechanically connected and supported by at least one guide rod plate. In one aspect, the at least one plate comprises a pair of guide rod plates disposed above and below the gas trap, respectively. Each plate has through openings for receiving respective guide rods. The guide rods provide guides for vertical travel, while the guide rod plates provide upper and lower travel limits.

A method of capturing gaseous phase fluids from a fluid return is also provided herein. The fluid return is preferably drilling fluids at a drill site. The drilling fluids reside within a tank.

The method first includes providing a gas trap system. The gas trap system is configured in accordance with the gas trap system described above in its various embodiments.

The method additionally includes placing the gas trap system within the return tank. The return tank may be, for example, a mud pit, a possum belly, a box adjacent a shale shaker, or other drilling fluids return tank.

The method further includes connecting the gas trap to a guide stand. The guide stand comprises at least one elongated vertical bar having an upper end and a lower end. In accordance with the method, the lower end of the guide stand is connected to the wall of a return tank such that the gas trap resides within the return tank.

The method also includes adjusting the location of the upper guide rod plate to provide an upper limit of vertical travel to the gas trap when the tank receives return fluids.

The method further comprises providing power to the gas trap of the system. The power serves to agitate the drilling fluids in the return tank, thereby releasing gases from the tank. Preferably, the gas trap comprises an air motor for providing rotational energy to a shaft and connected impeller. Providing power to the gas trap then comprises providing compressed air to the air motor.

The method additionally includes delivering gases released from the fluid return to a gas riser assembly. The gas riser assembly prohibits drilling fluids from reaching laboratory equipment, connected via a gas sample line, in the event the gas trap system is fully submerged within the drilling fluids. If fluids enter the riser, a cork will rise and engage the needle valve which stops suction until the gas riser assembly is manually cleared. Gases are then released to laboratory equipment for fluid analysis.

In one embodiment of the method, a ballast is provided around the lower end of the canister. The ballast defines a cylindrical housing having sealed through openings for receiving the guide rods. The housing also includes a port for receiving a weighting fluid such as an aqueous fluid. Adding or removing aqueous fluid allows an operator to adjust the vertical location of the canister and impeller along the guide rods. The method may then further comprise adding water or other ballasting fluid to the ballast through the port.

BRIEF DESCRIPTION OF THE DRAWINGS

So that the manner in which the present inventions can be better understood, certain illustrations, charts and/or flow charts are appended hereto. It is to be noted, however, that the drawings illustrate only selected embodiments of the inventions and are therefore not to be considered limiting of scope, for the inventions may admit to other equally effective embodiments and applications.

DETAILED DESCRIPTION OF CERTAIN EMBODIMENTS

Definitions

As used herein, the term "pipe" may refer to any tubular body fabricated from steel. Non-limiting examples include drill pipe, casing, production tubing and injection tubing.

As used herein, the term "tank" refers to any vessel or containment for holding a fluid. Nonlimiting examples of a tank include a possum belly, a mud pit and a box adjacent shale shakers.

As used herein, the term "wellbore" refers to a hole in the subsurface made by drilling or insertion of a conduit into the subsurface. A wellbore may have a substantially circular cross section, or other cross-sectional shapes. The term "well," when referring to an opening in the formation, may be used interchangeably with the term "wellbore." The term "bore" refers to the diametric opening formed in the subsurface by the drilling process.

Description of Selected Specific Embodiments

Figure 1A:
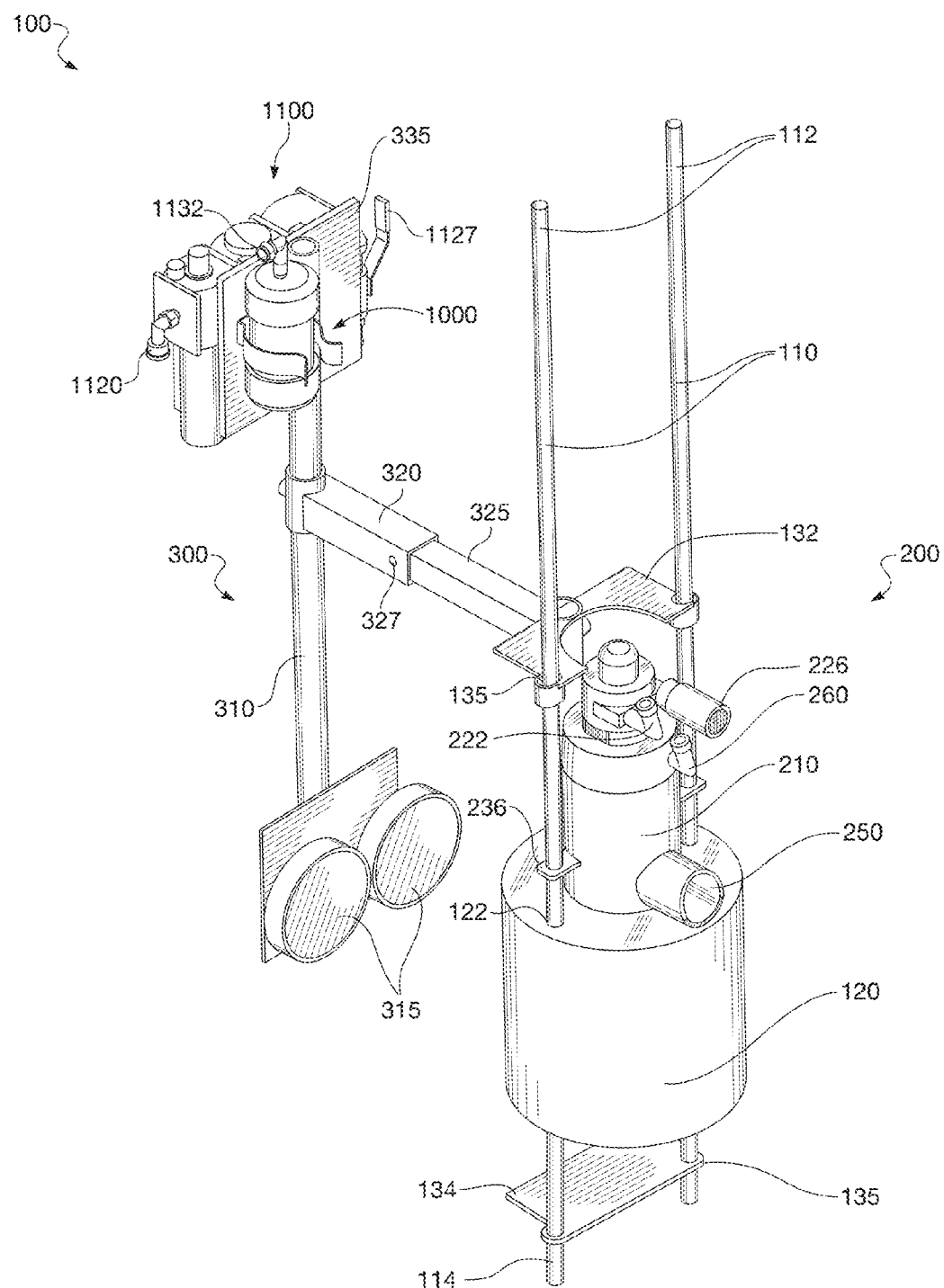
FIG. 1A is a perspective view of a gas trap system of the present invention, in one embodiment.

FIG. 1A is a perspective view of a gas trap system 100 of the present invention, in one embodiment. The gas trap system 100 is designed to agitate drilling fluids residing within a return mud tank at a drill site, and then to release gaseous phase fluids for analysis. Analysis may take place at the drill site or at a lab remote from the well being drilled.

Figure 1B:
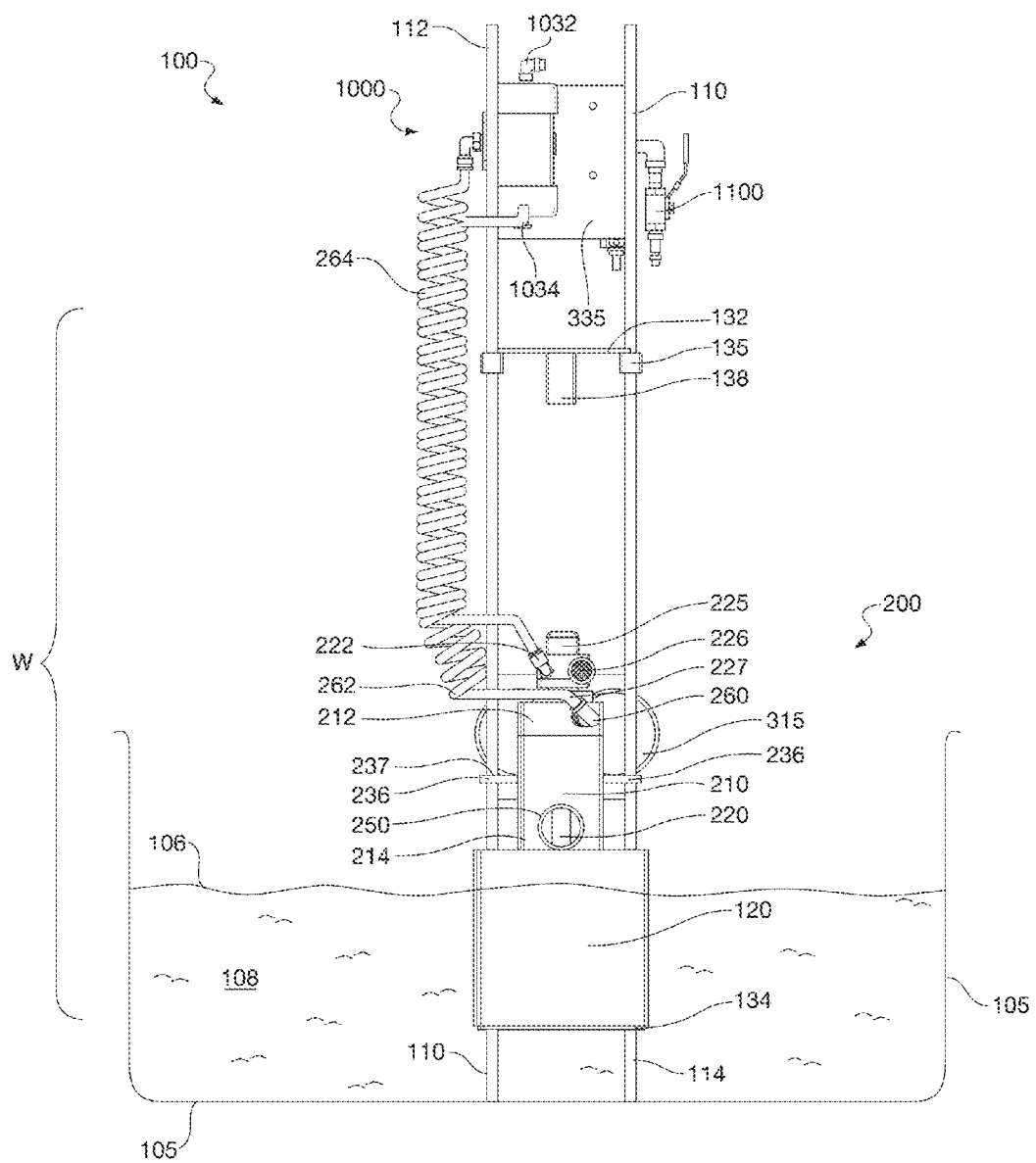
FIG. 1B is a front view of the gas trap system of FIG. 1A. Here, the gas trap system has been placed in a fluid returns tank.

In FIG. 1A, the gas trap system 100 is shown in a stand-alone condition. FIG. 1B offers a front view of the gas trap system 100 of FIG. 1A. Here, the system 100 is shown residing within a fluids return tank. The fluids return tank is shown schematically at 105. Drilling mud is shown within the tank 105 at 108. Gases from the drilling mud 108 are analyzed during a rotary drilling operation as described above and as known in the art.

The gas trap system 100 will be described herein with reference to FIGS. 1A and 1B together. The gas trap system 100 first includes a gas trap 200. The gas trap 200 is configured to agitate drilling fluids in the return tank 105, and then to release gases during agitation.

Figure 2A:
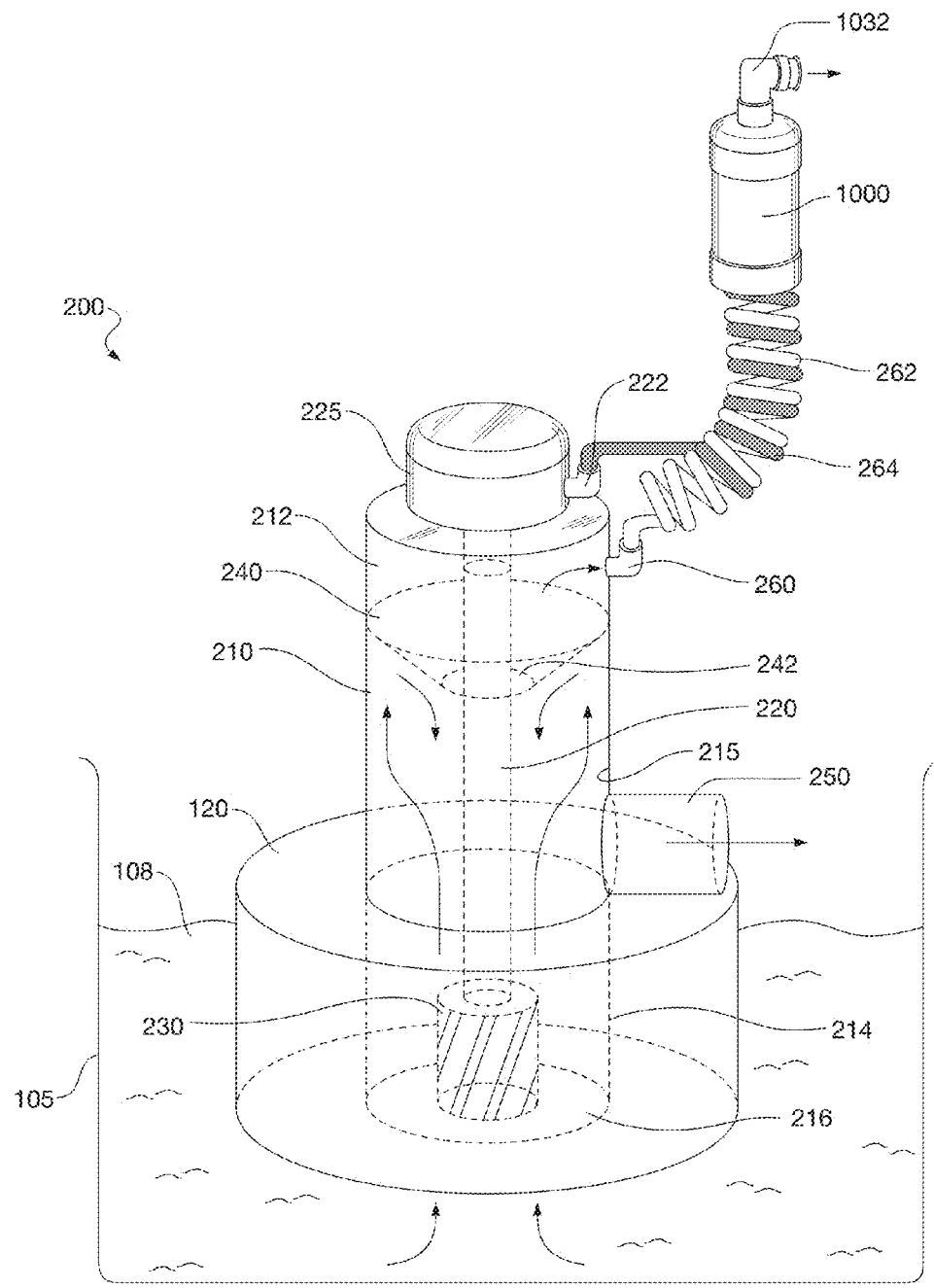
FIG. 2A is an enlarged schematic view of the gas trap of the gas trap system of FIG. 1B, in one arrangement.
Figure 2B:
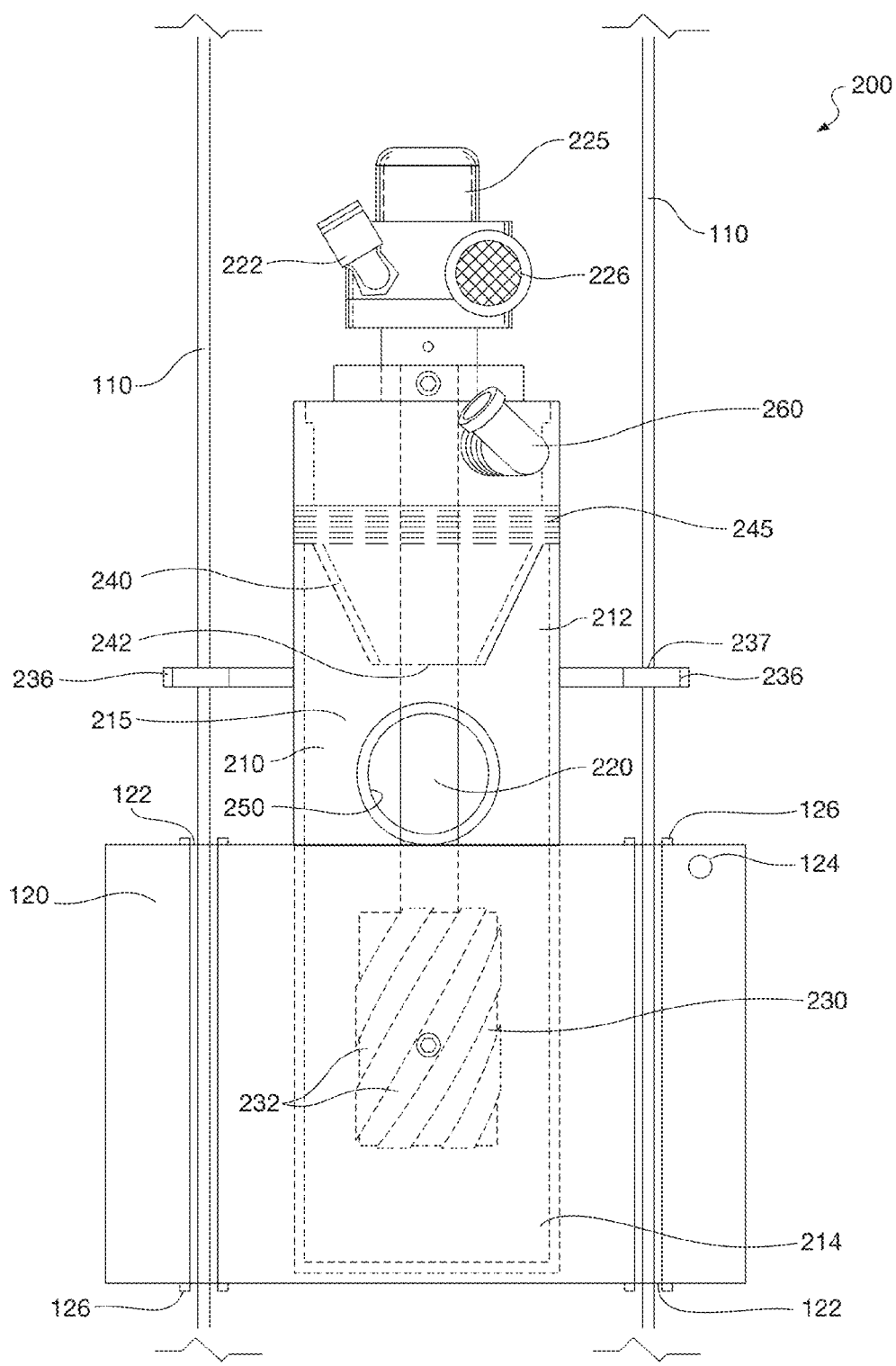
FIG. 2B is another enlarged schematic view of the gas trap of the gas trap system of FIG. 1B, in a more detailed view.

FIG. 2A is an enlarged schematic view of portions of the gas trap 200 of the gas trap system 100 of FIG. 1B. FIG. 2B is a side view of the gas trap 200 of the gas trap system 100 of FIG. 1. The gas trap 200 will be described with reference to FIGS. 2A and 2B together.

The gas trap 200 first comprises a canister 210. The canister 210 defines a tubular body that has an upper end 212 and a lower end 214. The upper end 212 is generally sealed, while the lower end 214 has an opening 216 for receiving drilling fluids 108. A chamber 215 is formed within the canister 210.

The gas trap 200 also includes a shaft 220. The shaft 220 resides axially along the canister 210. At the upper end 212 of the canister 210, the shaft 220 is connected to a motor 225. Preferably, the motor 225 is an air motor that receives power from one or more air compressors (not shown) associated with a drilling operation. The air compressors supply pneumatic energy to the motor 225, which in turn generates rotational motion to the shaft 220. In one aspect, the shaft 220 rotates at about 1,000 to 4,000 rpm.

An air inlet 222 is shown in FIG. 2B. An optional air muffler 226 may be provided for the air motor 225, as also shown in FIG. 2B.

Proximate the lower end 214 of the canister 210, the shaft 220 is connected to an impeller 230. Rotation of the shaft 220 imparts rotational movement to the impeller 230. When activated, the impeller 230 agitates the drilling fluid 108, and moves the drilling fluid 108 up into the chamber 215 of the canister 210.

It is understood that the air motor 225 may be designed to impart either clockwise or counter-clockwise rotation to the shaft 220. The direction of rotation will cause fluids to either be immediately raised within the canister 210, or pushed down in the canister 210 whereupon fluids will be forced to rise up along the radial wall of the canister 210. It is believed that the latter approach creates greater agitation with the same air pressure, generating a higher degree of gas breakout.

The use of an impeller 230 has advantages over prior art devices. Prior art devices have used whisks or tines that are vulnerable to the presence of water loss materials in the drilling mud. Such materials may include pecan hull pieces, cellulosic materials or fibrous strands. These objects have a tendency to wrap themselves around tines or to clog whisks, thereby limiting the agitation and the resulting liberation of hydrocarbon gases. Also, whisks or tines typically wear to a fine edge or point that may cause injury during replacement; in contrast, the impeller 230 wears smoothly along its edges.

The impeller 230 has a series of channels (seen in FIG. 2B at 232). The channels 232 force the drilling fluid 108 in a direction that is generally parallel to the impeller shaft 220. This also causes the drilling fluid or mud to fan out within the canister 210 and to travel at a higher rate of speed than would be achieved using known agitation systems. This, in turn, improves the liberation of hydrocarbon (and other) gases.

It is also believed that the channels 232 allow the impeller 230 to rotate at lower rpm's while still being effective. This reduces air pressure and lubricating oil consumption which increases the operational efficiency of the motor 225. In one aspect, the air pressure requirement for driving the impeller is less than 25 psi. Further, the impeller 230 itself should enjoy a longer operating life.

The impeller 232 is preferably fabricated from a solid metal material such as aluminum or aluminum alloy. In one embodiment, the impeller 230 has an outer diameter of 2.5 to 3.0 inches, and a length of 3 to 5 inches. The channels 232, or flutes, arc at 120° over 4.0 inches around the outer diameter of the impeller 232. The channels 232 may have a width of about 7/16 inches and a depth of 0.6 inches (6/1000).

The gas trap 200 also has a baffle 240. The baffle 240 resides within the canister 210 above the impeller 230. In the arrangement of FIGS. 2A and 2B, the baffle 240 has a frusto-conical profile. An opening 242 resides at the bottom of the baffle 240, permitting gaseous phase fluids to rise up through the canister 210 above the baffle 240. At the same time, the baffle 240 generally impedes upward movement of liquids in the canister 210. While the baffle 240 that is shown in FIGS. 2A and 2B is generally conical or frusto-conical, it is understood that any device capable of limiting passage of liquids while permitting gas to escape upward during fluid agitation may be used. For example, an array of perforated internals may be used.

It is observed that the presence of the baffle 240 separates the canister 210 into upper and lower chamber portions. Liquids generally stay below the baffle 240 in the lower chamber. This keeps mud from being vacuumed along with the liberated hydrocarbon gases, thus damaging costly gas analysis equipment. In a preferred embodiment, and as described more fully below in connection with FIG. 7B, the canister 210 comprises a pair of cylindrical bodies 710, 720 forming separate upper and lower chambers.

The baffle 240 may optionally have small slots 245 for further releasing gases. Flanges (not shown) may be placed below the slots to prevent liquids from inadvertently moving up through the baffle 240. This is one manner of providing perforated internals.

The gas trap 200 further includes a liquids exhaust port 250. The liquids exhaust port 250 resides below the baffle 240. The liquids exhaust port 250 circulates or releases fluids out of the canister 210. Stated another way, the liquids exhaust port 250 provides an outlet for drilling fluids 108 in the liquid phase that are drawn into the canister 210 by the impeller 230.

The gas trap 200 also includes a gas exhaust port 260. The gas exhaust port 260 is configured to release gases from the canister 210 during agitation. In the arrangement of FIG. 2A, the gas exhaust port 260 serves as a conduit for gases to travel to a riser 262 via vacuum line 227. A vacuum system (not shown) may be attached to the gas riser assembly 1000 to assist in pulling gases into the assembly 1000. Gases exit the assembly 1000 through an outlet 1032. From there, the gaseous phase fluids are analyzed by a petroleum geologist, chemist or lab technician using known analytical equipment.

It is desirable for the vertical position of the gas trap 200 to be adjusted within the fluid returns tank 105. This allows the gas trap 200 to respond to changes in fluid level, weight (or specific gravity) and viscosity of the drilling fluid 108. Accordingly, the gas trap 200 is operatively connected to components, referred to herein as upper and lower guide rod plates 132, 134, that permit a range or window of vertical movement within the tank 105. An illustrative travel window is shown at bracket W in FIG. 1B.

Returning back to FIGS. 1A and 1B, the gas trap system 100 offers at least one guide rod 110. In the front view of FIG. 1B, a pair of rods 110 is offered. Each rod 110 has an upper end 112 and a lower end 114. The guide rods 110 are vertically positioned, and are designed to connect to the gas trap 200 within a fluid returns tank 105 at a well drilling site.

The guide rods 110 may be fabricated from any rigid, corrosion-resistant material. Examples include stainless steel, rubber-coated steel, anodized aluminum, and plastic. The guide rods 110 may be either tubular or solid, and may have any profile.

The gas trap system 100 also optionally comprises a ballast 120. The ballast 120 defines a cylindrical housing that holds a volume of air or water or other ballasting fluid. In this way, the ballast 120 moves the gas trap 200 up and down along the guide rods 110 in response to changes in level, specific gravity and viscosity of the drilling fluids in the return tank 105. Thus, the ballast 120 allows the gas trap 200 to float near a surface 106 of the drilling fluids 108 while keeping the impeller 230 below the surface 106 of the drilling fluids 108.

To accommodate this movement, in one aspect the ballast 120 contains sealed through-openings 122. The through-openings 122 are sized to slidably receive the respective guide rods 110. The shape of the through-openings 122 generally matches the profile of the guide rods 110. Plastic or metal bushings 126 line the through-openings to reduce friction between the guide rods 110 and the through-openings 122. Preferably, the bushings 126 are UHMW (ultra-high molecular weight polyethylene) bushings that are somewhat self-lubricating and that are corrosion resistant.

In a preferred embodiment, the housing of the ballast 120 is cylindrical. The lower end 214 of the canister 210 extends through an inner diameter of the cylindrical housing representing the ballast 120. It is understood that the inner volume of the ballast 120 may be tuned to fit the needs of the operator.

In the illustrative arrangement of FIGS. 1A and 1B, the guide rods 110 are mechanically connected and supported by at least one connection plate. In one aspect, the at least one connection plate comprises an upper guide rod plate 132 and a removable lower guide rod plate 134. The upper guide rod plate 132 is located proximate the upper end 112 of the respective rods 110, while the lower guide rod plate 134 is secured proximate the lower end 114 of the respective rods 110. The upper guide rod plate 132 and the lower guide rod plate 134 comprise through-openings 135 for receiving respective guide rods 110.

In one embodiment, the upper guide rod plate 132 and the lower guide rod plate 134 each defines a rigid body. The body accommodates the canister 210 and the ballast 120 between the guide rods 110. The upper 132 and lower 134 guide rod plates provide limits for the vertical travel of the canister 210 along the guide rods 110.

The gas trap system 100 optionally comprises a pair of flanges 236. The flanges 236 extend from opposing sides of the outer wall of the canister 210. Each flange 236 includes a through-opening 237 for slidably receiving a respective guide rod 110. In the event that fluid conditions in the return tank should cause the canister 210 to rise, the canister 210 and connected motor 225 and impeller 230 will rise along the guide rods 110. The flanges 236 will hit the upper guide rod plate 132 should the canister 210 rise that far.

It is observed that during a drilling process, fluid return levels will constantly change. Additionally, viscosity of the fluid returns may change. Additionally, during a wellbore formation (or drilling) process, drilling mud returns will tend to get lighter in density. This can cause a gas trap to fall too low in the tank. In some cases, this can render a fixed agitation system ineffective.

In the inverse, when mud weight and viscosity increase, buoyancy increases. This can cause the gas trap to float too high in the fluid returns. When this happens, the impeller 230 may rise above the surface 106 of the drilling fluids 108.

It is desirable to keep the impeller 230 at least partially submerged. Accordingly, the upper guide rod plate 132 is secured along the guide rods 110 at a location that provides an upper range for floating of the gas trap 200. As the gas trap 200 begins to float higher in the tank 105, the canister guide, or flanges 236, will come into contact with the upper guide rod plate 132, thus limiting its upward travel.

As an alternative, or in addition, water can be added through a port (shown at 124 in FIG. 2B) in the ballast 120. The water will serve as a ballasting fluid in lieu of air to ensure that the impeller 230 stays submerged without manual resetting of the gas trap 200 position and without need of continuous monitoring. Ideally, the impeller 230 extends into at least one inch of return fluids.

In operation, the canister 210 is inserted into the ballast 120. The canister 210 is dropped to a point that the liquids exhaust port 250 rests on top of the ballast 120. The guide rods 110 are inserted into the through-openings 237 of the canister guides 236 and the ballast 120. The guide rods 110 are further dropped into through-openings for the lower stop plate 134. The stop plate 134 is preferably secured near the lower end 114 of the rods 110. Then, the upper guide rod plate 132 is connected near the top ends 112 of the guide rods 110, or at least at some point above the flanges 236.

Figure 9:
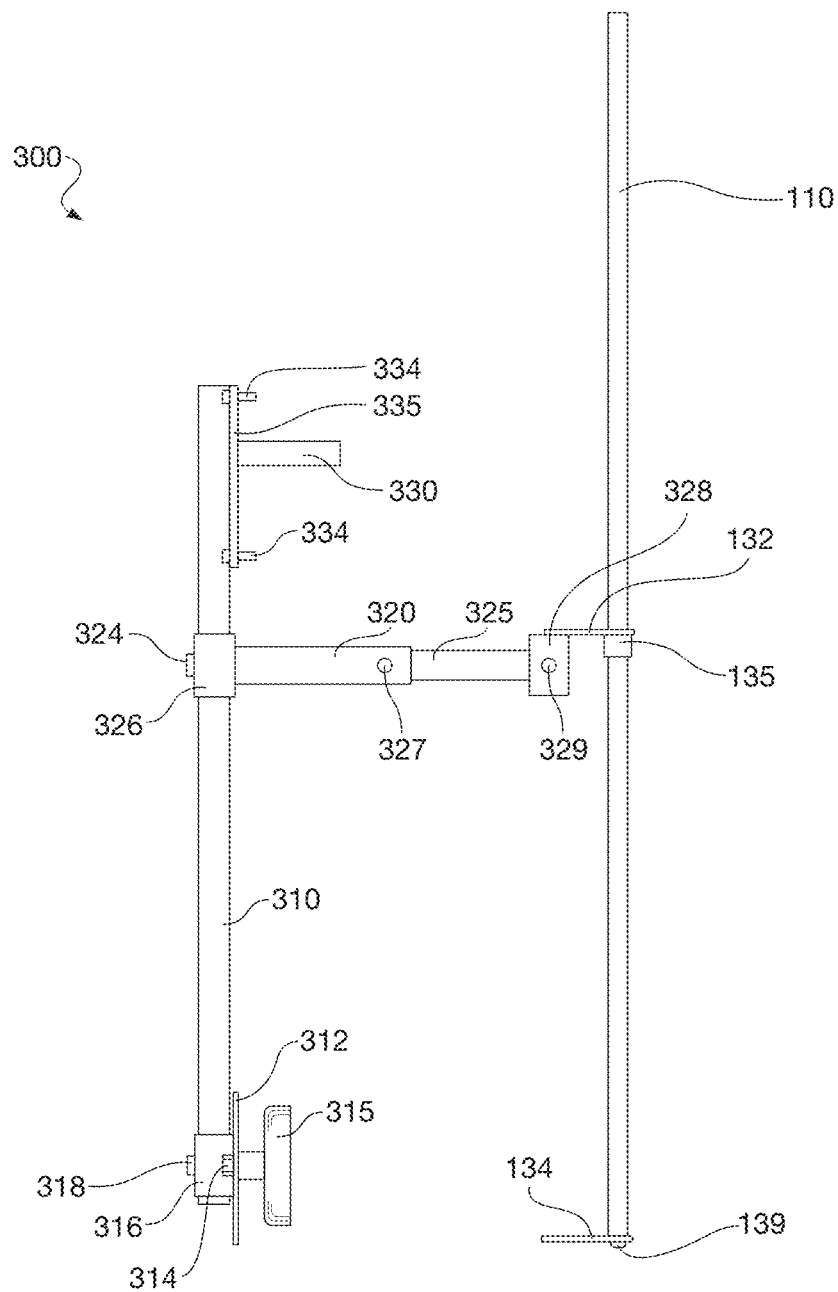
FIG. 9 is a side view of the stand assembly as may be used in the gas trap system of FIG. 1A.

It is noted that the upper adjustment plate 132 includes a directional tube mount 138. The directional tube mount 138 is used to secure the gas trap 200 to the stand assembly 300. This is accomplished by inserting the directional tube mount 138 into the inner square tubing 325 directional tube guide 328, as seen in FIG. 9. Set screw 329 is then tightened. The stand assembly 300, mounted outside the possum belly, is a frame that fixes the position of the gas trap system 200 within the tank 105.

Figure 3:
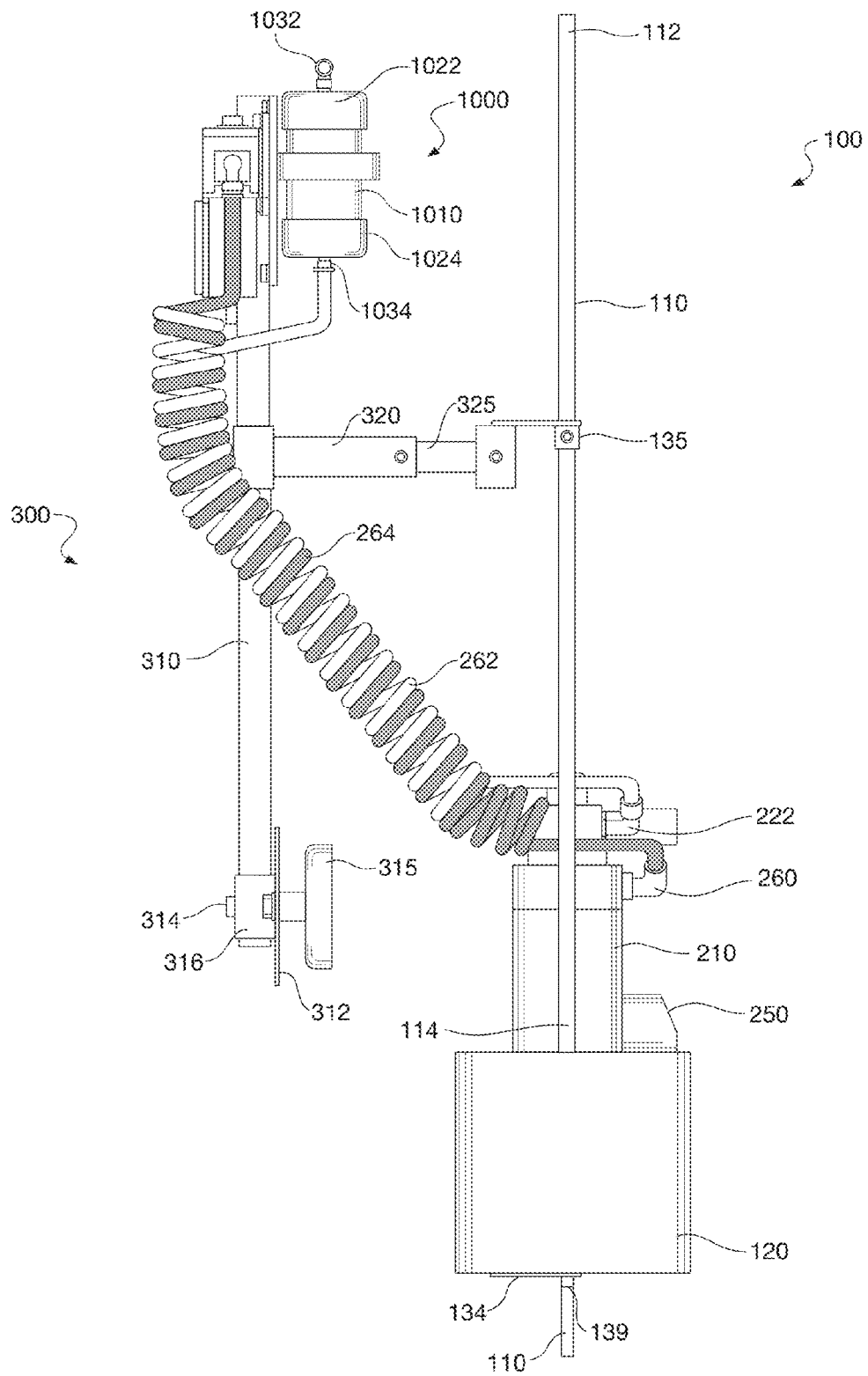
FIG. 3 is a side view of the gas trap system of FIG. 1A. Here, a stand assembly used for supporting the gas trap system and the gas riser assembly is more fully seen.

Additional views of components of the gas trap system 100 are offered herein. FIG. 3 presents a side view of the gas trap system 100 of FIG. 1A. Here, a stand assembly 300 is more readily seen. Additional details concerning the stand assembly 300 are set out in FIG. 9, discussed below.

Figure 4:
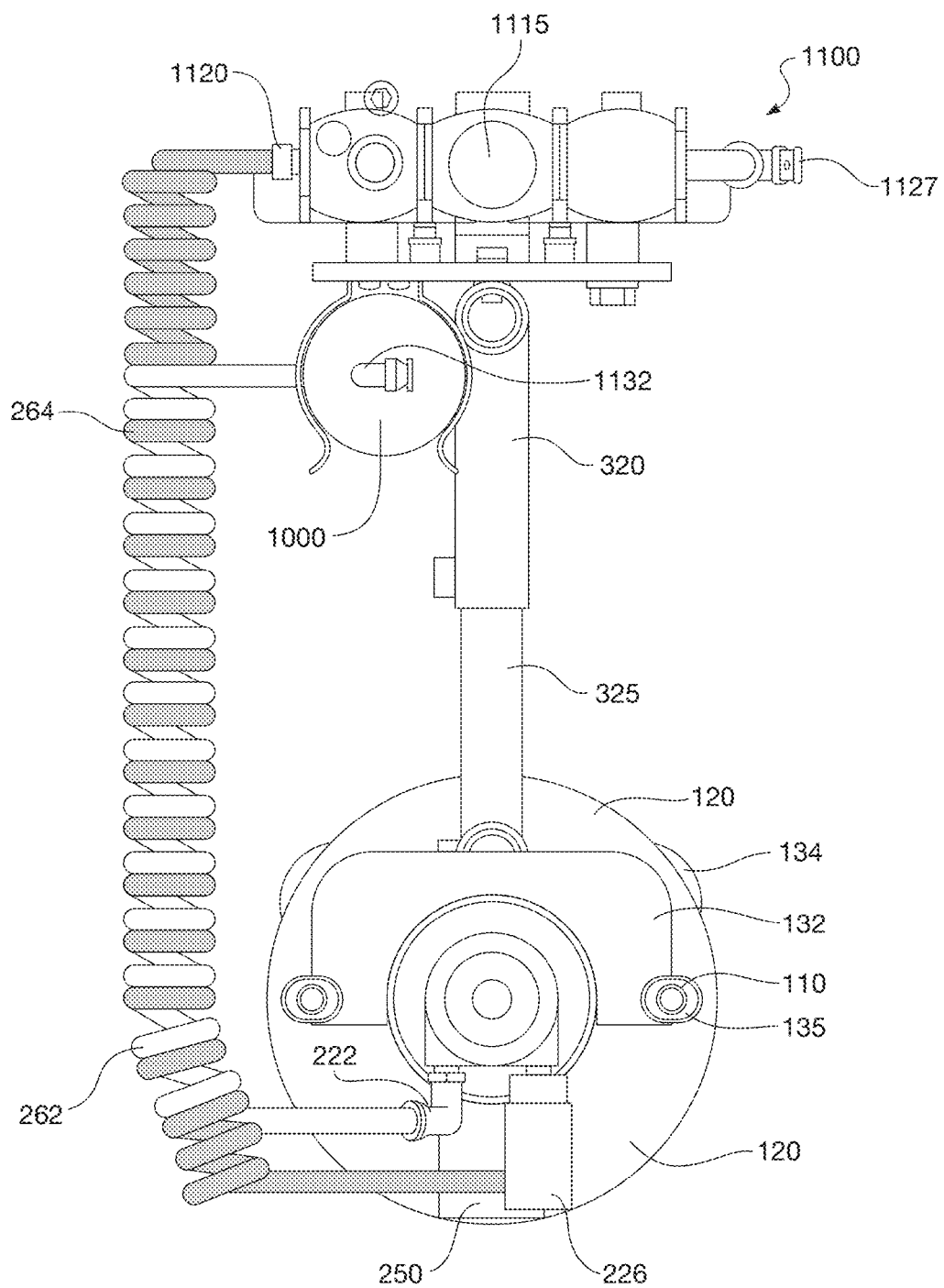
FIG. 4 is a top view of a gas riser assembly and an air regulator assembly of FIG. 1A. These components are supported by the stand assembly.

FIG. 4 is a top view of the gas trap system 100 of FIG. 1A. Here, a gas riser assembly 1000 and an air regulator assembly 1100 are seen. The gas riser assembly 1000 operates as a safety cut-off in line with a suction system while gases are pulled from the canister 210 to the laboratory equipment. The air regulator assembly 1100 operates to regulate the rpm's of the air motor which drives the impeller 230. Additional details of the gas riser assembly 1000 are presented in FIG. 10 and discussed below. Additional details of the air regulator assembly 1100 are presented in FIG. 11 and discussed below.

Figure 5:
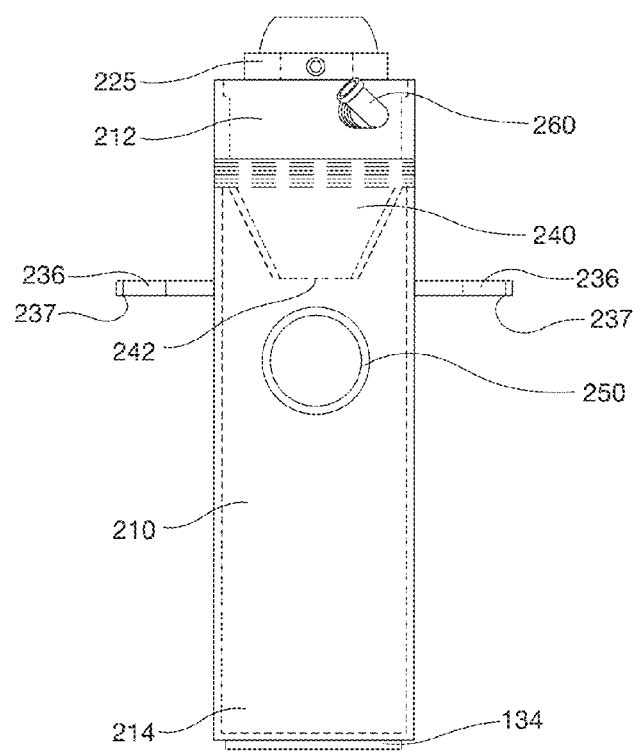
FIG. 5 is a front view of the canister from the gas trap of FIG. 2B. A liquid exhaust from the canister is visible.

FIG. 5 is a front view of the canister 210 from the gas trap 200 of FIG. 2A. The liquids exhaust port 250 is seen in plan view. The internal baffle 240 is shown in phantom.

Figure 6A:
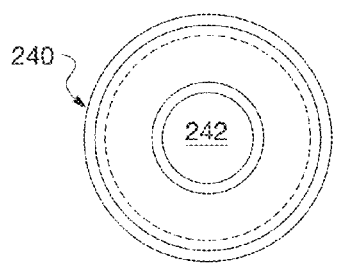
FIG. 6A is a top view of the baffle from the gas trap of FIG. 2B.

FIG. 6A is a top view of the baffle 240 from the gas trap 200 of FIG. 2B and FIG. 5.

Figure 6B:
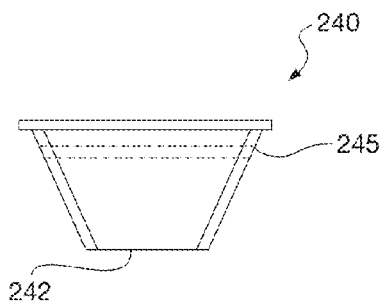
FIG. 6B is a side view of the baffle from the gas trap of FIG. 2B.

FIG. 6B is a side view of the baffle 240 from the gas trap 200 of FIG. 2B.

Figure 7A:
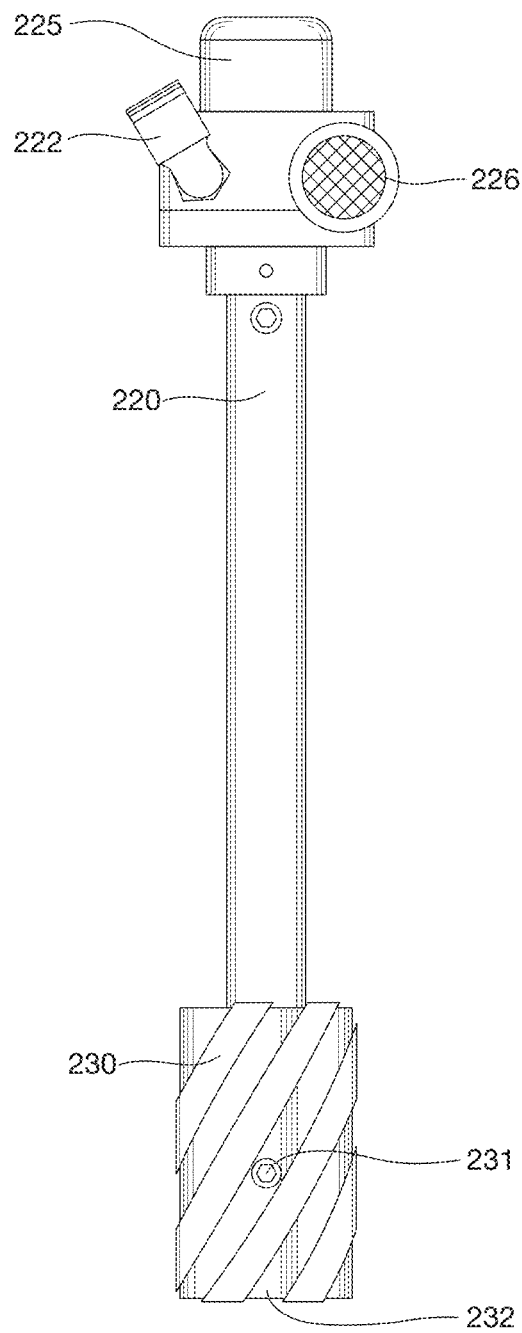
FIG. 7A is an enlarged side view of the motor and impeller from the gas trap system of FIG. 2B. The canister has been removed, exposing the shaft.

FIG. 7A is an enlarged side view of the motor 225 and impeller 230 from the gas trap system 100 of FIG. 2B. Here, the canister 210 has been removed, exposing the shaft 220.

In FIG. 7A, the muffler 226 is more clearly seen. In addition, a bolt 231 used for securing the impeller 230 along the shaft 220 is visible.

Figure 7B:
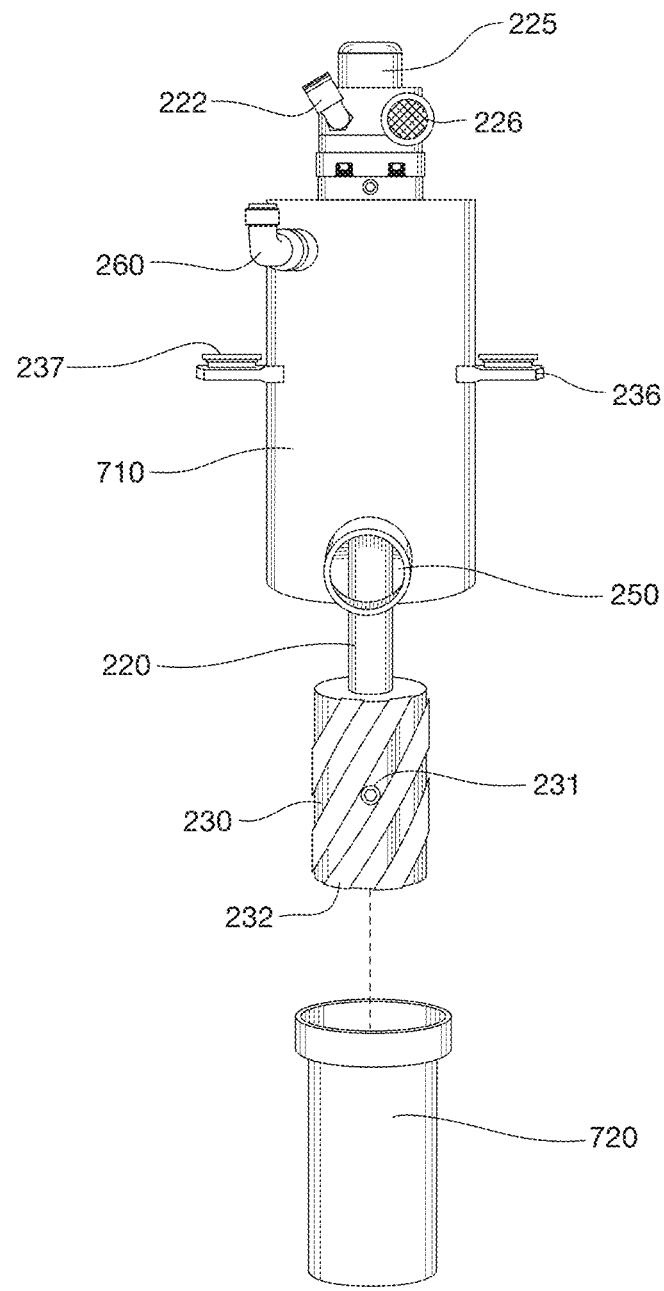
FIG. 7B is a side view of the canister from the gas trap system of FIG. 2B, in an alternate embodiment. Here, the canister comprises upper and lower fluid chambers formed by separate cylindrical bodies.

FIG. 7B is a side view of a canister from the gas trap system of FIG. 2B, in an alternate embodiment. Here, the canister comprises upper 710 and lower 720 fluid chambers formed by separate cylindrical bodies. The lower fluid chamber 720 is exploded away from the upper fluid chamber 710. The shaft 220 and connected impeller 230 are exposed.

It is noted that the lower chamber 720 has a reduced diameter. This design allows the impeller 230 to agitate the drilling fluid regardless of whether it is fully submerged. Only the bottom one inch of the impeller 230 needs to reside within the drilling mud to efficiently release hydrocarbon gases. Beneficially, the volume of drilling fluid expelled from the liquid exhaust port 250 is only slightly reduced in this design. Additionally, such a design reduces the need for the separate ballast 120. The operator need no longer ensure that the liquid exhaust port 250 is at an optimal height in relation to the drilling mud surface level.

Figure 7C:
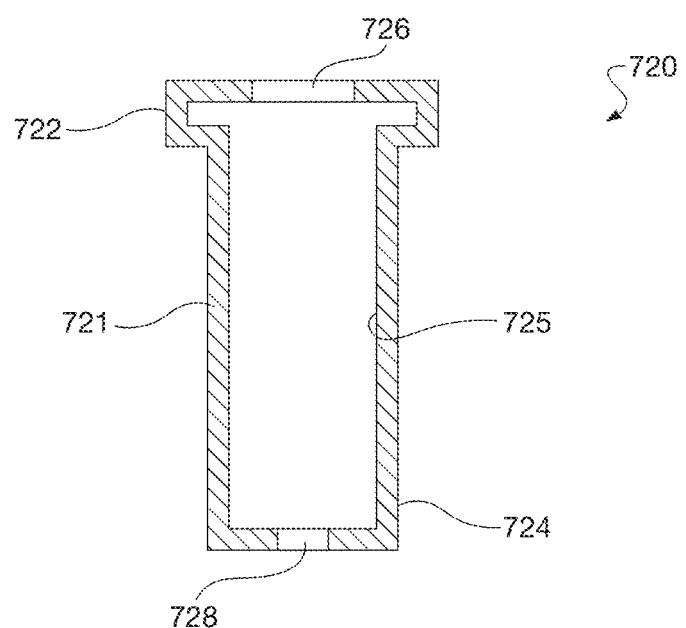
FIG. 7C is a side, cross-sectional view of the lower canister of FIG. 7B.

FIG. 7C offers an enlarged, cross-sectional view of the lower fluid chamber 720. Here, it can be seen that the lower chamber 720 defines a cylindrical body having a wall 721 and an inner bore 725. The inner bore 725 is dimensioned to receive the shaft 220 and connected impeller 230.

The lower fluid chamber 720 has an upper end 722 and a lower end 724. The wall 721 and inner bore 725 create a path for fluids moving upward from the lower end 724 to the upper end 722. The upper end 722 mechanically connects to the upper fluid chamber 710. The upper end 722 includes an opening 726 that receives the shaft 220 and that places the inner bore 725 in fluid communication with the baffle 240.

The lower fluid chamber 720 also has an opening 728 in the lower end 724. The opening 728 allows drilling fluids to enter the lower chamber 720. As the fluids enter the lower chamber 720, the impeller 230 churns in a downward motion (based on the direction of rotation of the shaft 220 and the orientation of the channels 232), creating something of a cavitation effect. Pressure within the inner bore 725 from the fluid motion causes drilling fluids to rise up the wall 721 of the lower chamber 720, through the upper opening 726, into the upper chamber 710 and out the liquids exhaust port 250.

Of note, the upper fluid chamber 710 has a larger inner diameter than that of the lower fluid chamber 720. This not only provides space for housing the baffle 240, but also allows a higher volume of hydrocarbon gases to collect as the fluids are expelled through the liquids exhaust port 250. Only during extreme cases, i.e., full submersion, would liquids ever enter the top chamber above the baffle 240 and try to invade the gas exhaust port 260.

Figure 8A:
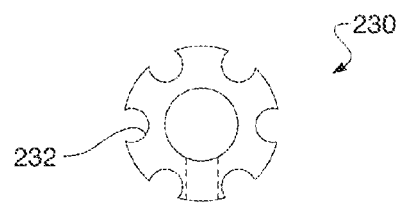
FIG. 8A is bottom view of a mixing blade which resides below the impeller from the gas trap of FIG. 2B.

FIG. 8A is bottom view of the impeller 230 from the gas trap 200 of FIG. 2B. This view presents a blade for churning fluid returns 108.

Figure 8B:
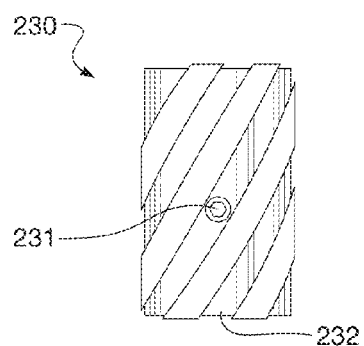
FIG. 8B is front view of the impeller from the gas trap of FIG. 2B.

FIG. 8B is front view of the impeller 230 from the gas trap 200 of FIG. 2B. The bolt 231 is again seen.

Figure 8C:
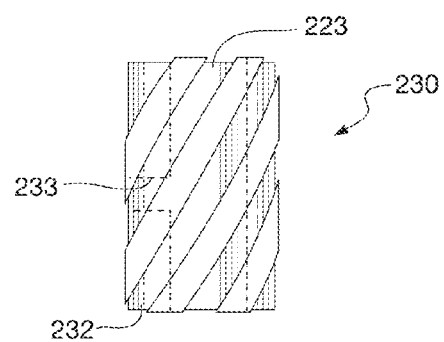
FIG. 8C is side view of the impeller from the gas trap of FIG. 2B.

FIG. 8C is side view of the impeller 230. An opening 233 dimensioned to receive the bolt 231 is shown in phantom. In addition, a separate opening 223 dimensioned to receive the shaft 220 is shown in phantom.

FIG. 9 is a schematic side view of the stand assembly 300 as may be used in the gas trap system 100 of FIG. 1B. As noted, the stand assembly 300 first includes one, and preferably two or even three, guide rods 110. The guide rods 110 are oriented vertically and provide a travel path for the air motor 225, the canister 210, the shaft 220 and the connected impeller 230.

The stand assembly 300 also includes the upper guide rod plate 132 and the lower guide rod plate 134 A through-opening 135 is provided to receive the guide rods 110. An optional guide rod bolt 139 provides a stop member for the lower guide rod plate 134 along the guide rods 110.

The stand assembly 300 also includes a main stand guide 310. The main stand guide 310 also preferably has a vertical orientation. The main stand guide 310 may have either a circular or a polygonal profile. The main stand guide 310 is affixed to the wall of the tank 105 to ultimately support the gas agitator 200.

In a preferred embodiment, the main stand guide 310 is affixed to the wall of the tank 105 by means of a pair of strong magnets 315. In the side view, only a single magnet 315 is shown. However, it is preferred that two, or even three, magnets 315 attached to the metal wall to support the main stand guide 310 and connected gas agitator components. The magnets 315 may be connected to the main stand guide 310 using, for example, a vertical mounting plate 312 and set screws 314.

The vertical mounting plate 312 is connected to a magnet mounting guide 316. The magnet mounting guide 316 is dimensioned to closely receive and slide along the main guide stand 310. The position of the magnet mounting guide 316 and the connected mounting plate 312 and magnets 315 may be adjusted relative to and along the main stand guide 310 upon loosening a set screw 318.

Also positioned along the main guide stand 310 is an outer square tubing 320. The outer square tubing 320 is affixed to the main guide stand 310 by means of a tubing guide 326. Like the magnet mounting guide 316, the outer square tubing guide 326 is dimensioned to closely receive and slide along the main guide stand 310. The position of the outer square tubing guide 316 and the connected square tubing 320 may be adjusted relative to and along the main stand guide 310 by loosening a separate set screw 324.

The outer square tubing 320 is dimensioned to slidably receive an inner square tubing 325. The inner square tubing 325 is connected to an inner square tubing guide 328. The inner square tubing guide 328 is operatively connected to the guide rods 110. In the arrangement of FIG. 9, this is done through a connection with the upper guide rod plate 132.

The distance of separation between the main guide stand 310 and the guide rods 110 may be adjusted by adjusting the position of the inner square tubing 325 inside the outer square tubing 320. In other words, the inner square tubing 325 slides into and along the outer square tubing 320. Once the desired distance of separation is achieved, set screw 327 is tightened.

Figure 10:
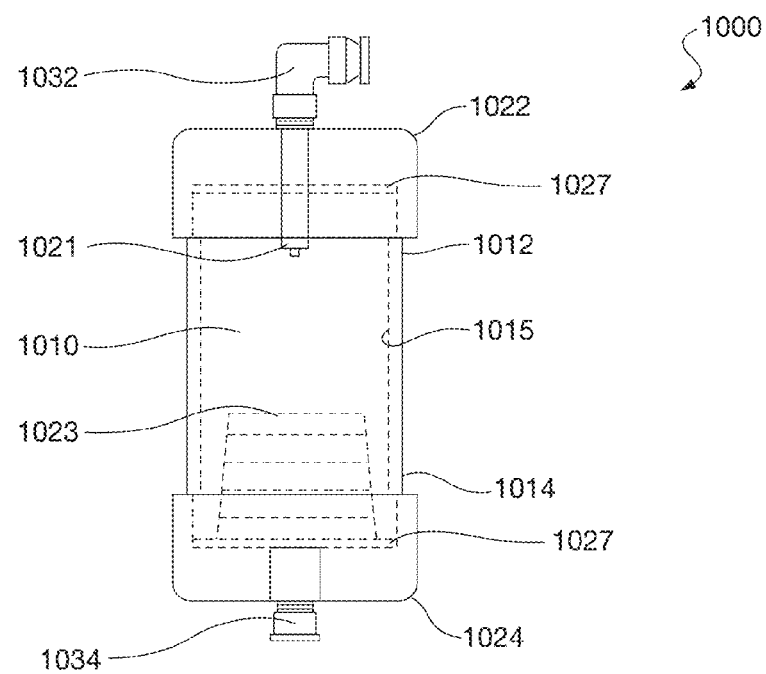
FIG. 10 is a side view of a gas riser assembly as may be used in the gas trap system of FIG. 1A.

The main guide stand 310 also supports a gas riser clamp 330. As the name implies, the gas riser clamp 330 supports the gas riser assembly 1000. FIG. 10 offers a side view of a gas riser assembly 1000 as may be used in the gas trap system of FIG. 1B. The gas riser assembly 1000 operates in line while released gases are pulled from the canister 210 to laboratory equipment.

The gas riser assembly 1000 first includes a gas riser body 1010. The gas riser body 1010 defines a tubular body having an upper end 1012 and a lower end 1014. The gas riser body 1010 has a substantially hollow bore 1015 through which escaped gases flow.

The gas riser body 1010 is configured to receive and support components of the gas riser assembly 1000. These include an upper cap 1022 and a lower cap 1024. The upper cap 1022 resides over (or covers) the upper end 1012 of the gas riser body 1010 while the lower cap 1024 resides over (or covers) the lower end 1014 of the gas riser body 1010. O-rings 1027 may be provided at the interfaces between the gas riser body (upper end) 1012 and the upper cap 1022, and between the gas riser body (lower end) 1014 and the lower cap 1034, to provide fluid seals.

The upper 1022 and the lower 1024 caps each receive a quick connect member. The upper cap receives an elbow quick connect 1032 while the lower cap 1024 receives a straight quick connect 1034. Of course, the configuration of the quick connects 1032, 1034 may vary so long as they are configured to sealingly receive a hose or other fluid-transmission body.

The gas riser assembly 1000 also includes a needle valve 1021. The needle valve 1021 resides along the upper quick connect 1032 at the upper end 1012 of the gas riser body 1010. The needle valve 1021 serves to regulate the flow of gaseous fluids out of the bore 1015 of the gas riser body 1010.

The gas riser assembly 1000 further includes a cork 1023. The cork 1023 is configured to receive gaseous fluids as they enter the gas riser body 1010 from the lower quick connect 1034. In the event fluids should pass through the quick-connect 1034 and enter the lower end 1014 of the body 1010, the cork 1023 will float up in the bore 1015 and contact the needle valve 1021. This will prevent the flow of liquids out of the quick-connect 1032.

It is understood that that gas riser assembly 1000 will include other components. The present inventions are not limited to the mechanics and configuration of the gas riser assembly 1000 unless expressly claimed.

Figure 11:
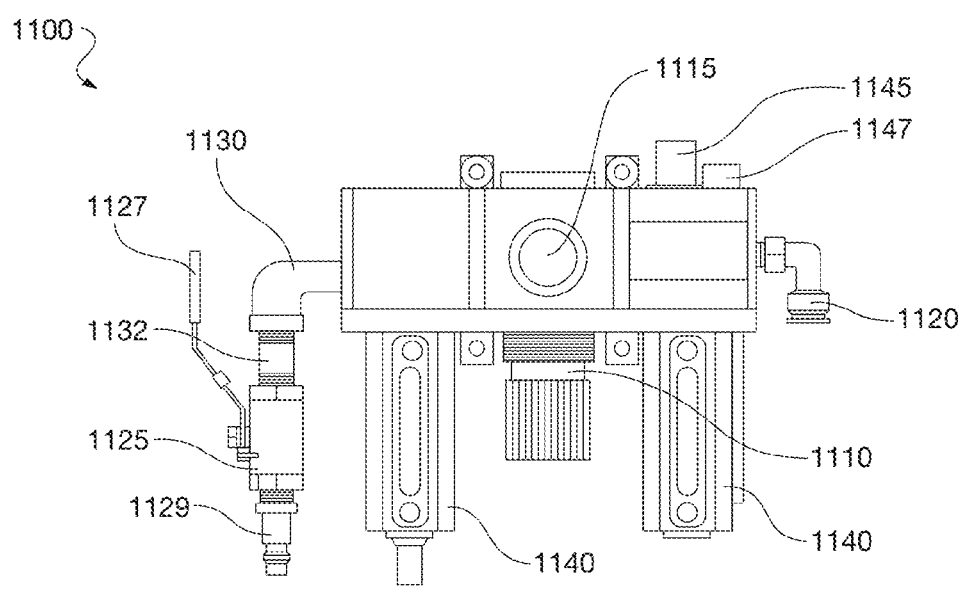
FIG. 11 is a side view of an air regulator assembly as may be used in the gas trap system of FIG. 1A.

Finally, and returning to FIG. 9, the main guide stand 310 supports an air regulator mounting plate 335. The air regulator mounting plate 335 is secured to the main guide stand 310 by means of bolts 334. The air regulator mounting plate 335, in turn, connects to the air regulator assembly 1100. FIG. 11 is a side view of an air regulator assembly 1100 as may be used in the gas trap system of FIG. 1. The air regulator assembly 1100 operates to regulate the rpm's of the air motor 225, which drives the impeller 230.

The air regulator assembly 1100 first includes an air regulator adjustment knob 1110. The air regulator adjustment knob 1110 serves as a manual control valve that may be turned to adjust (increase or decrease) the flow of gaseous fluids through the assembly 1100. An air pressure gauge 1115 is also provided to allow the operator to visually determine pressure within the regulator assembly 1100.

The air regulator assembly 1100 also includes a male coupler plug 1129. The male coupler plug 1129 is connected to a hose (not shown) that delivers air from air compressors. The threaded end of the male coupler plug 1129 is attached to a ball valve 1125 that may be opened and closed by turning a handle 1127. The ball valve 1125 releases air to a nipple 1132 that is connected to a street elbow 1130, which in turn directs air to the air regulator assembly 1100.

At the outlet end of the air regulator assembly 1100, a quick connect outlet 1120 is connected to a hose (shown at 264 in FIG. 1B). The hose 264 delivers regulated air to a quick connect (shown at 222 in FIG. 1B), thus powering the air motor 225.

Intermediate the intake street elbow 1130 and the outlet quick connect 1120 are water separators 1140. The water separators 1140 gravitationally remove any water coming in from the intake street elbow 1130 before forming within the air regulator assembly 1100 due to condensation.

Finally, the air regulator assembly 1100 includes an oiler adjustment knob 1145. The oiler adjustment knob allows the operator to adjust the amount of light oil available for the cooling and lubrication of the air motor 225. A sight glass 1147 is offered to enable the operator to monitor the oil level.

It is understood that that air regulator assembly 1100 will include other components. The present inventions are not limited to the mechanics and configuration of the air regulator assembly 1100 unless expressly claimed.

It can be seen that a floating gas trap system is provided. The floating system has a vertical range of travel. The upper end range of travel is limited by the ballast 120 contacting the upper guide rod plate 132. Similarly, the lower end range of travel is limited by the ballast 120 contacting the lower guide rod plate 134. Water or other ballasting fluid may be added to or drained from the ballast 120 to adjust buoyancy.

In one aspect, the floating capability of the system is limited by removing the ballast 120 and lowering the gas trap 200 until the liquids exhaust port 250 contacts the lower guide rod plate 134. The gas trap 200 may then be raised or lowered by adjusting the guide rods 110 through the through-openings 135 of the upper guide rod plate 132 and locked into the desired position.

The guide rods 110 allow the operator to set up a gas trap system quickly and without heavy equipment. Strong magnets 315 allow the main guide stand 310 to quickly secure the rods 110 to the base of ferrous metal drilling mud pits or tanks.

A method of capturing gaseous phase fluids from a fluid return is also provided herein. The fluid return is preferably drilling fluids at a drill site. The drilling fluids reside within a return tank.

The method first includes providing a gas trap system. The gas trap system is configured in accordance with the gas trap system described above in its various embodiments.

The method additionally includes placing the gas trap system within the return tank. The return tank may be, for example, a mud pit, a possum belly, a box adjacent a shale shaker, or other drilling fluids return tank. Preferably, placing the gas trap system within the return tank includes attaching a support stand (such as main guide stand 310) to the tank using magnets.

The method also includes providing power to the gas trap. The power serves to agitate the drilling fluids in the return tank, causing gases to be released from the tank. Preferably, the gas trap comprises an air motor for providing rotational energy to a shaft 220 and connected impeller 230. Providing power to the gas trap then comprises providing compressed air to the air motor. In one aspect, air is provided to the air motor under pressure from air compressors located at a drill site.

The method further includes delivering released gases to a riser for fluid analysis. As gases escape through the baffle 240 and up through the gas exhaust port 260, they enter the gas riser assembly 1000. The riser assembly 1000 prohibits drilling fluid from reaching laboratory equipment, connected via a gas sample line, in the event the gas trap system 100 is fully submerged within the drilling fluid 105. If fluid 105 enters the riser assembly 1000, the cork 1023 will rise and engage the needle valve 1021 which stops suction until the riser body 1010 is manually cleared. Gases are then released through the needle valve 1021 to laboratory equipment for fluid analysis.

In one embodiment of the method, the ballast 120 defines a sealed housing. The housing includes a port 124 for receiving a weighting fluid such as an aqueous fluid. Adding or removing the aqueous fluid allows an operator to adjust the vertical location of the canister 210 and impeller 230 along the guide rods 110. The method then further comprises adding water to the ballast 120 through the port 124.

As can be seen, an improved gas trap system for a drilling fluids return is provided. The gas trap system enables a gas trap to float near the top of a drilling fluids volume, and to efficiently release hydrocarbon gases from the drilling fluids or mud returns during well drilling operations. Beneficially, the gas trap system is designed to overcome the challenges of hydrocarbon gas extraction associated with the changes in fluid level, weight and viscosity of the drilling fluid. Moreover, the gas trap system may be used in any design of drilling mud pit or fluid returns tank.

It is understood that the gas trap system disclosed herein is merely illustrative. Other functional arrangements may be employed in accordance with the claims set forth below. Further, variations of the method for capturing gas-phase fluids may fall within the spirit of the claims, below. It will be appreciated that the inventions are susceptible to modification, variation and change without departing from the spirit thereof.

We claim:

1. A gas trap system, comprising:
   a motor;
   a gas trap configured to agitate drilling fluids when positioned in a return tank, and then to release gases during agitation, the gas trap comprising:
   an elongated canister having a wall;
   a through-opening at a lower end of the canister configured to receive drilling fluids from the return tank,
   an impeller adjacent the lower end of the canister,
   a shaft residing axially along an inner diameter of the canister, with the shaft operatively connected to the impeller and configured to impart rotational movement to the impeller in response to energy provided by the motor, thereby agitating the drilling fluids within the chamber of the canister,
   a conical baffle residing along the inner diameter of the canister
   a liquids exhaust port along a wall of the canister configured to release liquids from the canister during fluid agitation, and
   a gas exhaust port above the baffle configured to release gases from a top end of the canister also during fluid agitation;
   a ballast defining a cylindrical housing forming an inner diameter and an outer diameter, with the inner diameter receiving and being secured to the canister such that floatation of the ballast within the return tank causes reciprocal floatation of the gas trap;
   at least one vertical guide rod;
   an upper guide rod plate having through openings for slidably receiving corresponding vertical guide rods;
   a guide stand configured to releasably secure the at least one vertical guide rod and upper guide rod plate to a wall of the return tank; and
   wherein the ballast and secured gas trap are configured to travel vertically along the at least one guide rod in response to a change in a characteristic of the drilling fluids, with the upper guide rod plate serving as an upper travel limit.

2. The gas trap system of claim 1, wherein:
   the drilling fluids characteristic is (i) fluid level in a fluid returns tank, (ii) density of the drilling fluids, (iii) viscosity of the drilling fluids, and (iv) combinations thereof; and
   vertical travel of the gas trap is induced by flotation of the chamber in the drilling fluids when positioned in the return tank.

3. The gas trap system of claim 2, wherein the baffle comprises at least one through-passage for permitting gases to escape upward to the gas exhaust port, but substantially preventing upward movement of liquids during fluid agitation.

4. The gas trap system of claim 3, wherein the elongated canister further comprises at least one flange residing along an outer wall of the canister, the at least one flange serving as a stop member configured to abut the upper guide rod plate during upward travel of the gas trap.

5. The gas trap system of claim 3, wherein:
the canister comprises a lower fluid chamber which houses the impeller, and an upper fluid chamber above and in fluid communication with the lower fluid chamber which houses the baffle; and
the upper fluid chamber has an opening at a bottom end configured to receive return fluids from the lower fluid chamber.

6. The gas trap system of claim 5, wherein the impeller comprises an integral body having helical channels formed to urge drilling fluids upward through the upper portion of the lower fluid chamber during rotation.

7. The gas trap system of claim 5, wherein the liquids exhaust port resides at or below the level of the baffle.

8. The gas trap system of claim 5, wherein:
the at least one vertical guide rod comprises a pair of guide rods in spaced-apart parallel relation; and
the upper guide rod plate comprises a pair of through openings for slidably receiving the pair of guide rods.

9. The gas trap system of claim 8, further comprising:
a pair of flanges extending from opposing sides of the wall of the canister, each flange comprising a through opening for also receiving a respective guide rod.

10. The gas trap system of claim 8, wherein the ballast resides around at least the lower end of the canister, and the ballast comprises:
a port for receiving a weighting; and
through-openings within the cylindrical housing but external to and on opposing sides of the canister for slidably receiving corresponding guide rods.

11. The gas trap system of claim 10, wherein:
the ballast is tubular;
the lower end of the canister extends to an inner diameter of the housing of the ballast; and
the through-openings in the ballast comprise bushings for receiving the guide rods.

12. The gas trap system of claim 3, wherein the guide stand comprises:
an elongated vertical bar having an upper end and a lower end, the lower end being releasably connectible to the return tank; and
an extension tubing having a first end and a second end, wherein the first end is operatively connected to the vertical bar intermediate the upper and lower ends of the vertical bar, and the second end is operatively connected to the upper guide rod plate;
and wherein a length of the extension tubing is adjustable, thereby enabling an operator to adjust a distance between a wall of the fluid returns tank and the canister.

13. The gas trap system of claim 12, further comprising:
a lower guide rod plate residing below the canister and also having through openings for slidably receiving corresponding vertical guide rods, with the lower guide rod plate serving as a lower travel limit.

14. The gas trap system of claim 1, wherein:
the motor is an air motor for providing the rotational energy to the shaft; and
the impeller comprises three or more channels disposed arcuately about an outer diameter of the impeller, with the channels configured to agitate the drilling fluids in response to the rotational energy.

15. The gas trap system of claim 14, further comprising:
an air regulator assembly for regulating the flow of air from compressors to the air motor.

16. The gas trap system of claim 14, wherein the channels are configured to push fluid returns downward within the canister in response to the rotational energy.

17. The gas trap system of claim 16, wherein the air motor operates off of air from a compressor at a pressure less than 25 psi.

18. The gas trap system of claim 2, further comprising:
a gas riser assembly configured to receive gases from the gas exhaust port during the fluid agitation, the gas riser assembly comprising a main body configured to receive gases released from the gas exhaust port at a lower inlet and into a main bore; and
a hose for delivering released gases from the gas exhaust port to the lower inlet.

19. The gas trap system of claim 18, wherein the gas riser assembly comprises:
a floating cork residing at the lower inlet; and
a needle valve located above the lower inlet at an upper outlet;
wherein the needle valve is configured to shut off the upper outlet in the event the cork floats upward within the main body to the outlet in response to the presence of liquids in the main body.

20. The gas trap system of claim 12, wherein:
the guide stand comprises at least one magnet supported proximate a lower end of the guide stand; and
the lower end of the guide stand magnetically connects to a wall of the return tank.

21. A gas trap system, comprising:
a pneumatic motor;
a gas trap configured to agitate drilling fluids when positioned in a return tank, and then to release gases during agitation, the gas trap comprising:
an elongated canister having a wall defining an upper fluid chamber and a lower fluid chamber, wherein an upper portion of the lower fluid chamber is received within the upper fluid chamber, and wherein the lower fluid chamber has an inner diameter that is smaller than an inner diameter of the upper fluid chamber;
a through-opening at a lower end of the lower fluid chamber configured to receive drilling fluids from the return tank;
an impeller adjacent the lower end of the canister and extending into the lower fluid chamber,
a shaft residing axially along the canister, with the shaft operatively connected to the impeller and configured to impart rotational movement to the impeller in response to energy provided by the motor, thereby agitating the drilling fluids within the chamber of the canister,
a liquids exhaust port along the wall of the upper fluid chamber configured to release liquids from the canister during fluid agitation, and
a gas exhaust port configured to release gases from a top end of the upper fluid chamber also during fluid agitation;
at least one vertical guide rod; and
a ballast defining a cylindrical housing forming an inner diameter and an outer diameter, with the inner diameter receiving and being secured to the canister such that floatation of the ballast within the return tank causes reciprocal floatation of the gas trap and enabling the gas trap to travel vertically along the at least one guide rod in response to a change in a characteristic of the drilling fluids.

22. The gas trap system of claim 21, wherein:
the drilling fluids characteristic is (i) fluid level in a fluid returns tank, (ii) density of the drilling fluids, (iii) viscosity of the drilling fluids, and (iv) combinations thereof.

* * * * *